March 17, 1942.  F. W. MEREDITH  2,276,734

ROTARY BEARING

Filed Sept. 16, 1941

Inventor
F. W. Meredith
By
Watson, Cole, Grindle
& Watson,
Attorneys.

Patented Mar. 17, 1942

2,276,734

UNITED STATES PATENT OFFICE 2,276,734

ROTARY BEARING

Frederick William Meredith, Cricklewood, London, England, assignor to S. Smith & Sons (Motor Accessories) Limited, Cricklewood, London, England Application September 16, 1941, Serial No. 411,081
In Great Britain May 8, 1940

8 Claims. (Cl. 308—189)

This invention relates to rotary bearings and is especially applicable to bearings for gyroscope gimbals.

The invention is concerned with rotary bearings of the kind having inner and outer races or bearing surfaces carrying both thrust and journal loads of which the outer race has a bearing surface of cup-like part-spherical form so that the bearing may be self-aligning.

According to the present invention there is provided a rotary bearing of the kind referred to wherein the outer race has a part-spherical mounting surface around the bearing surface and having the same centre, which mounting surface is held against a support by spring or like resilient means applying endwise pressure to the outer race. The inner race may therefore move a small amount transversely by tilting of the outer race and have endwise movement together with the outer race against the restraint of the spring.

In one construction of the rotary bearing according to the invention the mounting surface is formed by a peripheral extension of the cup-like part-spherical bearing surface of the outer race and the support comprises a sleeve which is engaged at one end in this extension of the bearing surface. Preferably, one or more resilient buffers are provided between the inner race and the support to limit displacement of the inner race and a resilient member may also be provided on the support to limit movement of the outer race about the centre of the part-spherical bearing surface.

In some cases it is required to provide a fluid passage through the bearing and according to a further feature of the invention a journal having the inner race thereon and a support for the outer race are provided with fluid passages which are interconnected by a ball-ended pipe located at its ends in recesses in the journal and support respectively.

Two specific constructions of rotary bearing especially applicable to bearings for gyroscope gimbals are shown by way of example in the accompanying drawing, in which.

Figure 1:
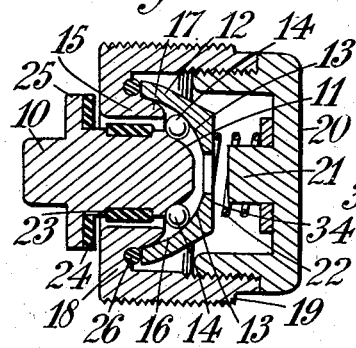
Figure 1 is a sectional elevation of one construction of the bearing.

Referring to Figure 1 a journal 10 is formed integral with an inner ball race 11 at one end and the outer race consists of a cup-shaped member 12 having a part-spherical inner bearing surface 13. A plurality of balls 14 is provided between the bearing surfaces of the two races.

The support for the outer race comprises a sleeve 15 through which the journal passes with ample clearance. The cup-like outer race 12 is extended at the periphery to form a mounting surface 16 which is an extension of the part-spherical bearing surface 13. The sleeve 15 has a round-nosed end 17 which projects into the cuplike outer race 12 and engages with the mounting surface 16.

The sleeve 15 is integral with a radially extending flange 18 and an outer tubular part 19 surrounding the outer race. On to this tubular part 19 there is screw-threaded an end member 20 having a central spigot 21 extending inwardly towards the outer race. A coiled compression spring 22 mounted on the spigot 21 is interposed between the end member 20 and a flat transverse surface 34 of the outer race. This spring maintains the outer race against the mounting surface 17 and also resiliently restrains rotation of this race about a transverse axis through the centre of its spherical bearing surface.

In order to limit displacement of the journal 10 a peripheral resilient buffer 23 is provided on the journal 10 within the sleeve 15 and another peripheral resilient buffer 24 is provided on a flange 25 of the journal 10 close to the flange 18 of the support. A ring 26 of resilient material may be provided between the rim of the cup-like outer race 12 and the flange 18 of the support to limit possible movement of the outer race about the centre of its spherical surface.

Figure 2:
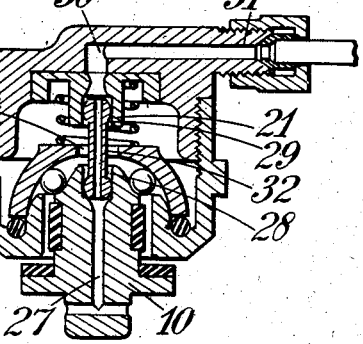
Figure 2 is a sectional elevation of another form of the bearing having a fluid passage therethrough.

The construction shown in Figure 2 is similar to that shown in Figure 1 except that means is provided for conducting fluid through the bearing. The journal 10 is provided with an axial bore 27 terminating in an enlarged recess 28. The spigot 21 which may be formed by a separate inset in the end member 20 is provided with a similar recess 29 communicating by means of a passage 30 in the end member with a spigot 31 for a pipe connection. A short pipe 32 which is ball-ended at each end is mounted with one end in the recess 28 of the journal and the other end in the recess 29. This pipe passes through a clearance hole 33 in the outer race.

In the rotary bearing as exemplified by the specific constructions above described the journal 10 is permitted to move relatively to the supporting sleeve 15 both axially and transversely against the restraint of the spring 22.

Figure 3:
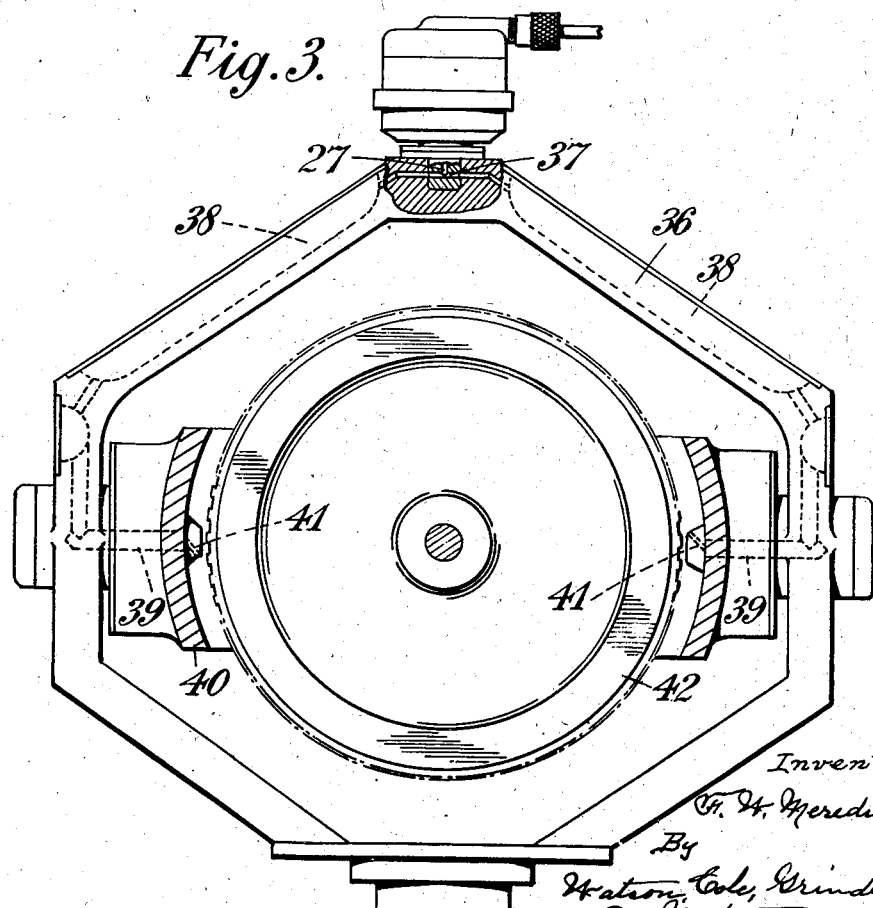
Figure 3 is a diagrammatic view showing the application of the bearing illustrated in Figure 2 to a gyroscope gimbal.

In Figure 3 there is shown the application of the bearing illustrated in Figure 2 for supporting the outer gimbal of a gyroscope. The bearing carries the outer gimbal indicated at 36 on the journal 10 and the bore 27 in the journal communicates by means of a cross duct 37 with conduits 38 communicating with other conduits 39 passing through bearings for an inner gimbal 40. These bearings for the inner gimbal may also be of the form shown in Figure 2. The conduits 39 terminate at nozzles 41 for directing jets of air on to a rotor 42 in order to spin the rotor.

I claim:

1. A self-aligning rotary bearing comprising an inner race, an outer race, said outer race having a cup-like part-spherical bearing surface carrying said inner race and having a part-spherical mounting surface having the same sphere centre as said bearing surface, a support for said outer race and resilient means applying endwise pressure to said outer race for holding said mounting surface of the outer race against said support.

2. A self-aligning rotary bearing comprising an inner race, an outer race, said outer race having a cup-like part-spherical bearing surface carrying said inner race and having a part-spherical mounting surface having the same sphere centre as said bearing surface, a support for said outer race and resilient means applying endwise pressure to said outer race for holding said mounting surface of the outer race against said support and maintaining the outer race at a normal position with regard to rotation about another transverse axis passing through the sphere centre.

3. A self-aligning rotary bearing comprising an inner race, an outer race, said outer race having a cup-like part-spherical bearing surface carrying said inner race and having a part-spherical mounting surface having the same sphere centre as said bearing surface, a support for said outer race and resilient means applying endwise pressure to said outer race for holding said mounting surface of the outer race against said support, and restraining the outer race against rotation about all axes tangential both to the part-spherical mounting surface and to the surface of the support engaged by said mounting surface.

4. A self-aligning rotary bearing comprising an inner race, an outer race, said outer race having a cup-like part-spherical bearing surface carrying said inner race and a peripheral extension of said bearing surface, a support for said outer race comprising a sleeve engaging at one end in said extension of the bearing surface and resilient means applying endwise pressure to said outer race for holding the peripheral extension of the said bearing surface against said end of the sleeve.

5. A self-aligning rotary bearing comprising an inner race, an outer race, said outer race having a cup-like part-spherical bearing surface carrying said inner race and a peripheral extension of said bearing surface, a support for said outer race comprising a sleeve engaging at one end in said extension of the bearing surface, resilient means applying endwise pressure to said outer race for holding the peripheral extension of the said bearing surface against said end of the sleeve and a resilient buffer between the inner race and the said support to limit displacement of the inner race.

6. A self-aligning rotary bearing comprising an inner race, an outer race, said outer race having a cup-like part-spherical bearing surface carrying said inner race and a peripheral extension of said bearing surface, a support for said outer race comprising a sleeve engaging at one end in said extension of the bearing surface, resilient means applying endwise pressure to said outer race for holding the peripheral extension of the said bearing surface against said end of the sleeve, and a resilient member on said support limiting movement of the outer race about the sphere centre of the part-spherical bearing surface.

7. A self-aligning rotary bearing comprising an inner race, an outer race, said outer race having a cup-like part-spherical bearing surface carrying said inner race and having a part-spherical mounting surface having the same sphere centre as said bearing surface, a support for said outer race, resilient means applying endwise pressure to said outer race for holding said mounting surface of the outer race against said support, a journal carrying said inner race, said journal and said support having fluid passages with enlarged recesses at adjacent ends and a ball-ended pipe located at its ends in said recesses in the journal and support respectively.

8. A self-aligning rotary bearing comprising a journal having an inner bearing race, an outer race having a cup-like part-spherical bearing surface carrying said inner race and having a peripheral extension of said bearing surface, a support for the outer race, said support having a sleeve around said journal endwise engaged by said extension of the part-spherical bearing surface of the outer race, a spring interposed between the support and the outer race for holding the outer race in endwise engagement with the said sleeve, resilient means interposed between said journal and said support for limiting endwise radial movement of the journal and a ring of resilient material interposed between the periphery of the outer race and the support to assist location of the outer race.

FREDERICK WILLIAM MEREDITH.